United States Patent
Kawakami et al.

(10) Patent No.: US 9,235,694 B2
(45) Date of Patent: Jan. 12, 2016

(54) RECORDING MEDIUM, AUTHENTICATION DEVICE, AND AUTHENTICATION METHOD

(71) Applicant: KYOCERA Document Solutions Inc., Osaka (JP)

(72) Inventors: Satoshi Kawakami, Osaka (JP); Yoshitaka Matsuki, Osaka (JP); Masato Tanba, Osaka (JP); Yosuke Nakazato, Osaka (JP); Wataru Endo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 8 days.

(21) Appl. No.: 14/470,138

(22) Filed: Aug. 27, 2014

(65) Prior Publication Data
US 2015/0067826 A1 Mar. 5, 2015

(30) Foreign Application Priority Data

Aug. 30, 2013 (JP) ................................. 2013-180548

(51) Int. Cl.
| | | |
|---|---|---|
| G06F 21/31 | (2013.01) | |
| G06F 3/0484 | (2013.01) | |
| H04W 12/06 | (2009.01) | |
| H04W 88/02 | (2009.01) | |

(52) U.S. Cl.
CPC ............ *G06F 21/31* (2013.01); *G06F 3/04847* (2013.01); *G06F 21/316* (2013.01); *H04W 12/06* (2013.01); *G06F 2203/04808* (2013.01); *H04W 88/02* (2013.01)

(58) Field of Classification Search
CPC ................. G06F 21/31; G06F 3/04847; G06F 2203/04808
See application file for complete search history.

(56) References Cited

U.S. PATENT DOCUMENTS

| | | | | |
|---|---|---|---|---|
| 7,793,225 B2* | 9/2010 | Anzures | .................. | G06F 3/017 345/173 |
| 7,877,707 B2* | 1/2011 | Westerman | ......... | G06F 3/04883 715/863 |
| 7,956,848 B2* | 6/2011 | Chaudhri | ............ | G06F 3/04883 345/173 |
| 8,452,260 B2* | 5/2013 | Matsuoka | ......... | H04M 1/72577 348/14.03 |
| 8,788,834 B1* | 7/2014 | Sang | ....................... | G06F 21/36 713/183 |

(Continued)

FOREIGN PATENT DOCUMENTS

JP  2012-084005 A  4/2012

OTHER PUBLICATIONS

Touch Gestures Based Biometric Authentication Scheme for Touchscreen Mobile Phones; Yuxin Meng, Duncan S. Wong, Roman Schlegel, and Lam-for Kwok; Inscrypt 2012, LNCS 7763, pp. 331-350, 2013.*

(Continued)

*Primary Examiner* — James Turchen
(74) *Attorney, Agent, or Firm* — Studebaker & Brackett PC

(57) ABSTRACT

An electronic device includes a touch panel, a time information obtaining section, and an authentication section. The time information obtaining section obtains time information for user authentication. The authentication section executes user authentication based on the time information obtained by the time information obtaining section. The time information obtaining section changes the time information according to a user's touch duration on the touch panel and changes an amount of change in time that the time information indicates according to a user's manner of touching the touch panel.

12 Claims, 9 Drawing Sheets

(56) References Cited

U.S. PATENT DOCUMENTS

| | | | |
|---|---|---|---|
| 9,146,669 B2* | 9/2015 | Kim | G06F 3/017 |
| 2005/0162407 A1* | 7/2005 | Sakurai | G06F 21/36 |
| | | | 345/173 |
| 2007/0281666 A1* | 12/2007 | Yoshida | H04M 1/021 |
| | | | 455/411 |
| 2008/0136587 A1* | 6/2008 | Orr | G08C 19/00 |
| | | | 340/5.31 |
| 2010/0231537 A1* | 9/2010 | Pisula | G06F 3/0481 |
| | | | 345/173 |
| 2013/0047238 A1* | 2/2013 | Hwang | H04L 9/3228 |
| | | | 726/7 |
| 2013/0139248 A1* | 5/2013 | Rhee | G06F 3/0346 |
| | | | 726/19 |
| 2013/0322848 A1* | 12/2013 | Li | H04N 5/783 |
| | | | 386/241 |
| 2013/0347101 A1* | 12/2013 | Wu | G06F 3/04883 |
| | | | 726/19 |
| 2014/0149921 A1* | 5/2014 | Hauser | G06F 3/0485 |
| | | | 715/784 |
| 2015/0109262 A1* | 4/2015 | Nagao | G06F 3/038 |
| | | | 345/178 |

OTHER PUBLICATIONS

Biometric-Rich Gestures: A Novel Approach to Authentication on Multi-touch Devices; Napa Sae-Bae, Kowsar Ahmed, Katherine Isbister and Nasir Memon; CHI'12, May 5-10, 2012, Austin, Texas, USA; 2012; ACM.*

* cited by examiner

RECORDING MEDIUM, AUTHENTICATION DEVICE, AND AUTHENTICATION METHOD

INCORPORATION BY REFERENCE

The present application claims priority under 35 U.S.C. §119 to Japanese Patent Application No. 2013-180548, filed Aug. 30, 2013. The contents of this application are incorporated herein by reference in their entirety.

BACKGROUND

The present disclosure relates to computer-readable non-transitory storage media storing an authentication program for user authentication that is to be executed based on a touch duration on a touch panel, authentication devices, and authentication methods.

A method for executing user authentication based on a user's touch duration during which a user touches a touch panel has been known in which the user authentication is successful when the touch duration on the touch panel is within a specific period.

SUMMARY

A non-transitory computer storage medium according to an embodiment of the present disclosure has stored thereon an authentication program executed by a computer in an electronic device equipped with a touch panel. The computer executes the authentication program to cause the electronic device to function as an authentication section and a time information obtaining section. The authentication section executes user authentication. The time information obtaining section obtains time information for the user authentication. The authentication section executes the user authentication based on the time information obtained by the time information obtaining section. The time information obtaining section changes the time that the time information indicates according to a user's touch duration on the touch panel and changes an amount of change in time that the time information indicates according to a user's manner of touching the touch panel.

An authentication device according to an embodiment of the present disclosure includes a touch panel, an authentication section, and a time information obtaining section. The time information obtaining section obtains time information for user authentication. The authentication section executes the user authentication based on the time information obtained by the time information obtaining section. The time information obtaining section changes time that the time information indicates according to a user's touch duration on the touch panel and changes an amount of change in time that the time information indicates according to a user's manner of touching the touch panel.

An authentication method according to an embodiment of the present disclosure includes: (i) executing, via an authentication section, user authentication; and (ii) obtaining, via a time information obtaining section, time information for the user authentication. The authentication section executes the user authentication based on the time information obtained by the time information obtaining section. The time information obtaining section changes the time that the time information indicates according to a user's touch duration on the touch panel and changes an amount of change in time that the time information indicates according to a user's manner of touching the touch panel.

DETAILED DESCRIPTION

Embodiments of the present disclosure will be described below with reference to the accompanying drawings.

First of all, a configuration of a mobile device will be described below that is an example of an authentication device according to the present embodiment.

Figure 1:
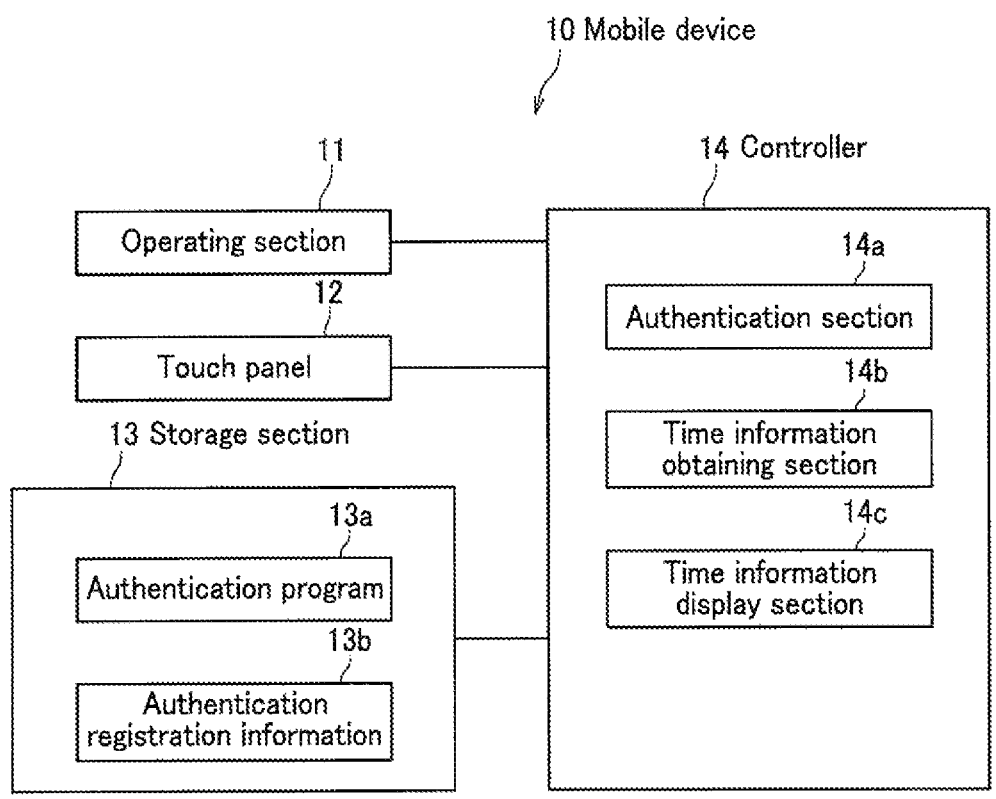
FIG. 1 shows a mobile device according to an embodiment of the present disclosure.

FIG. 1 shows a configuration of a mobile device 10 according to the present embodiment.

As shown in FIG. 1, the mobile device 10 includes an operating section 11, a touch panel 12, a storage section 13, and a controller 14. The operating section 11 is an input device including a button or the like to receive various types of operations. The touch panel 12 displays various types of information and receives various types of operations. The storage section 13 is a nonvolatile storage device that stores a program and various types of data, such as a flash memory. The controller 14 controls the overall operation of the mobile device 10.

The mobile device 10 is an example of an electronic device and may be a potable music player or a smartphone, for example.

The storage section 13 stores an authentication program 13a that the controller 14 is to execute. The storage section 13 functions as a "computer-readable non-transitory storage medium having stored thereon an authentication program". The authentication program 13a is installed in the mobile device 10 in the course of manufacture of the mobile device 10, for example. Alternatively, the authentication program 13a may be installed in the mobile device 10 via a recording medium or network.

The storage section 13 stores authentication registration information 13b used for user authentication. The authentication registration information 13b may be time information indicative of time, for example, 5 seconds.

Where the authentication registration information 13b is not stored yet in the storage section 13, the authentication registration information 13b can be written into the mobile device 10 according to user's instruction. Where the authentication registration information 13b is already stored, the authentication registration information 13b can be changed and deleted according to user's instruction when the mobile device 10 is in a usable state upon success of user authentication.

For successful user authentication in the mobile device 10, it is necessary for the user to memorize (or record on a note) the content (e.g., time) that the authentication registration information 13b indicates.

The controller 14 includes a central processing unit (CPU), a read only memory (ROM), and a random access memory (RAM), for example. The ROM stores a program and various types of data. The CPU executes the program stored in the ROM or the storage section 13. The RAM is used as a work area for the CPU.

The controller 14 functions as an authentication section 14a, a time information obtaining section 14b, and a time information display section 14c by executing the authentication program 13a stored in the storage section 13. The authentication section 14a performs user authentication. The time information obtaining section 14b obtains time information for user authentication (hereinafter referred to as authentication time information). The time information display section 14c causes the touch panel 12 to display time that the authentication time information indicates.

The time information obtaining section 14b is capable of switching its own mode between a normal mode and a time information editing mode according to user's instruction. In the normal mode, the time that the authentication time information indicates is changed according to a user's touch duration on the touch panel 12 and a user's manner of touching the touch panel 12. The user's touch duration herein is defined as a touch duration during which a user touches on the touch panel 12. In the time information editing mode, the time that the authentication time information indicates is changed according to only the user's manner of touching the touch panel 12 out of the user's touch duration and the user's manner of touching the touch panel 12.

An operation of the mobile device 10 will be described next.

Figure 2:
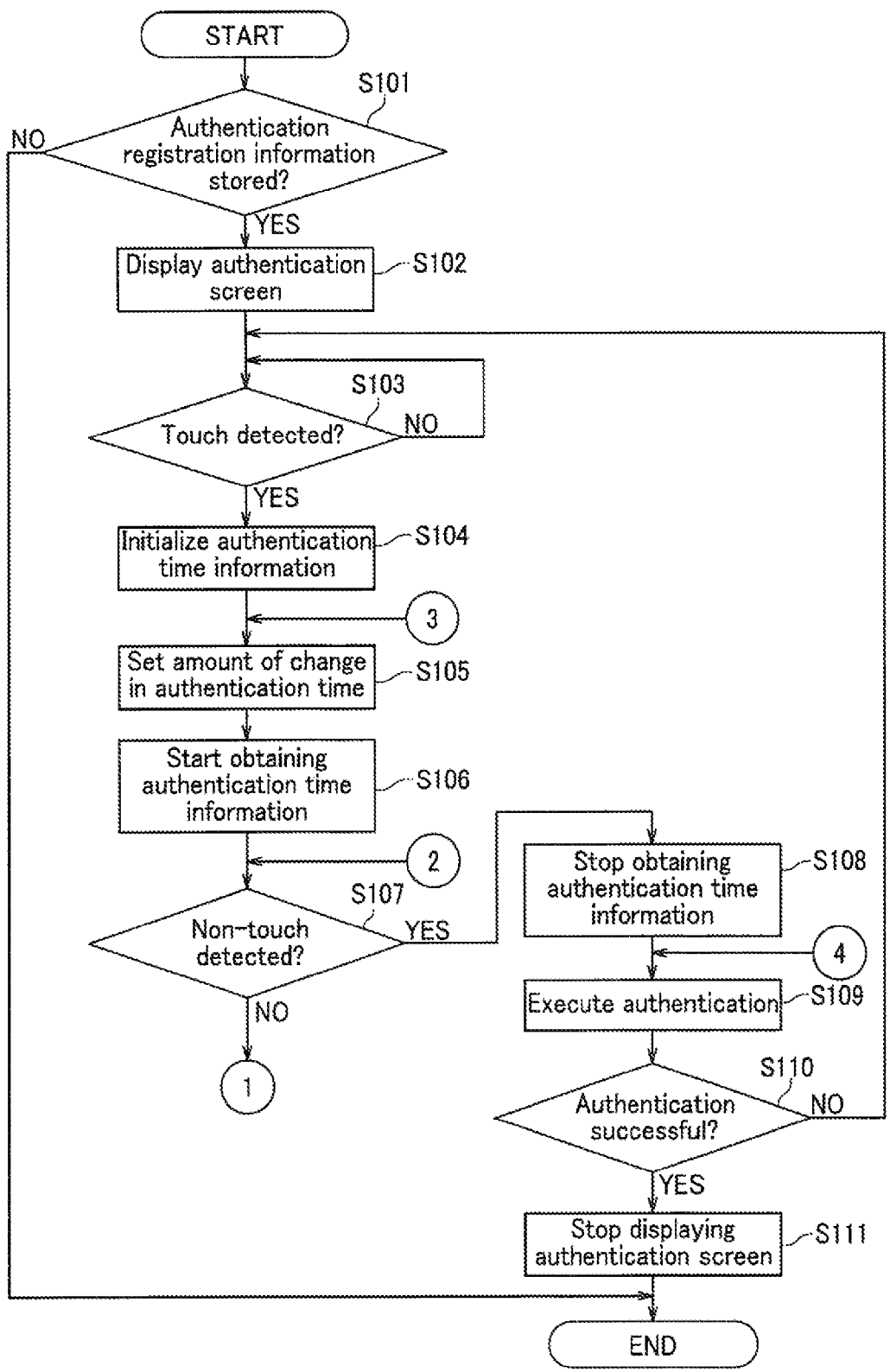
FIG. 2 shows a former half of an operation at a start of the mobile device shown in FIG. 1.
Figure 3:
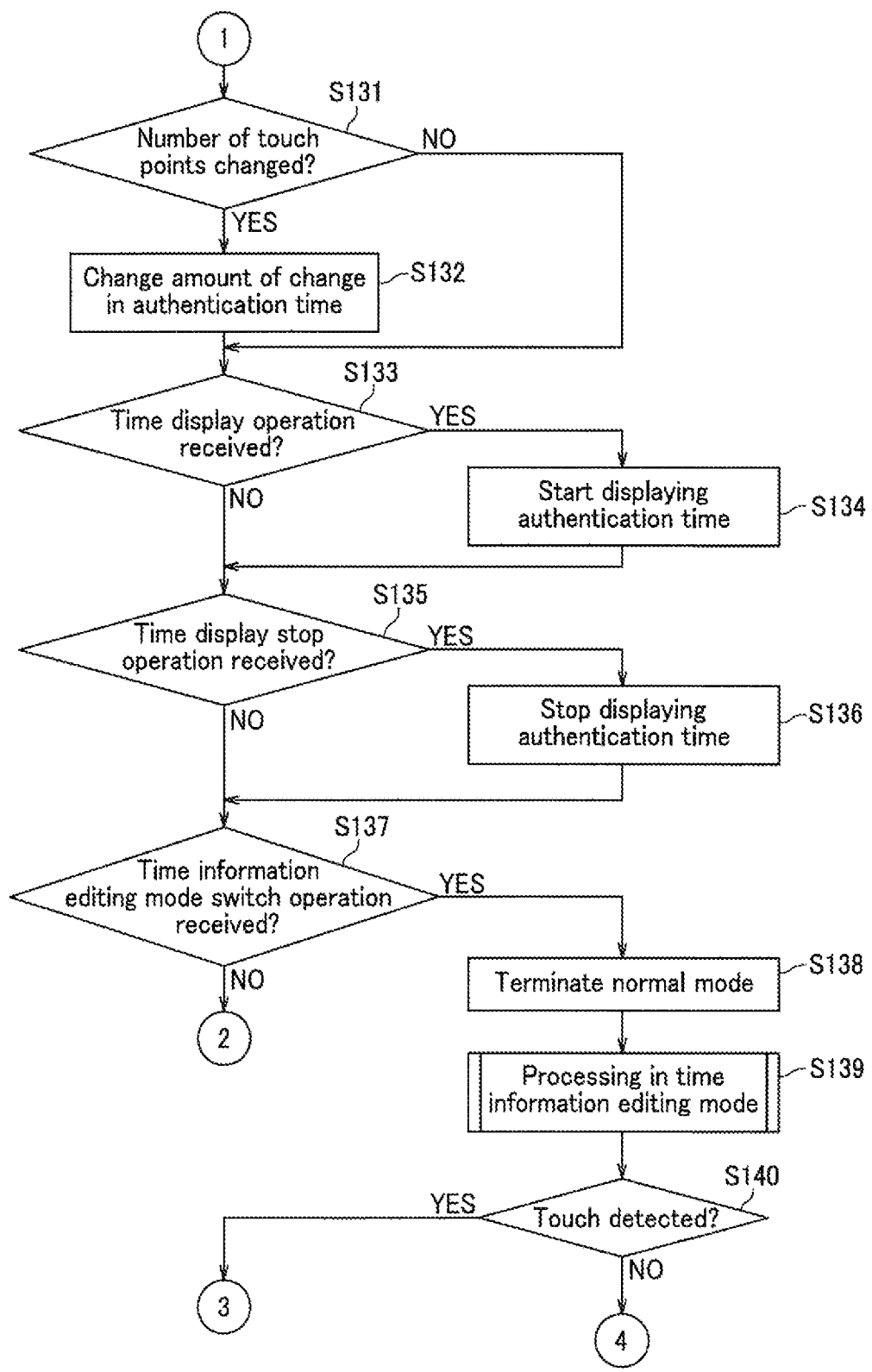
FIG. 3 shows a latter half of the operation at the start of the mobile device shown in FIG. 1.

FIG. 2 shows a former half of an operation at a start of the mobile device 10. FIG. 3 shows a latter half of the operation at the start of the mobile device 10. In the present embodiment, the information obtaining section 14b is set to the normal mode described with reference to FIG. 1 at a start of the mobile device 10.

As shown in FIG. 2, the authentication section 14a of the controller 14 in the mobile device 10 determines whether or not the authentication registration information 13b is stored in the storage section 13 (Step S101).

When the authentication section 14a determines at Step S101 that the authentication registration information 13b is not stored (written) in the storage section 13 (NO at Step S101), the operation shown in FIGS. 2 and 3 is ended. Then, the user is enabled to cause the mobile device 10 to execute any operation.

Figure 4:
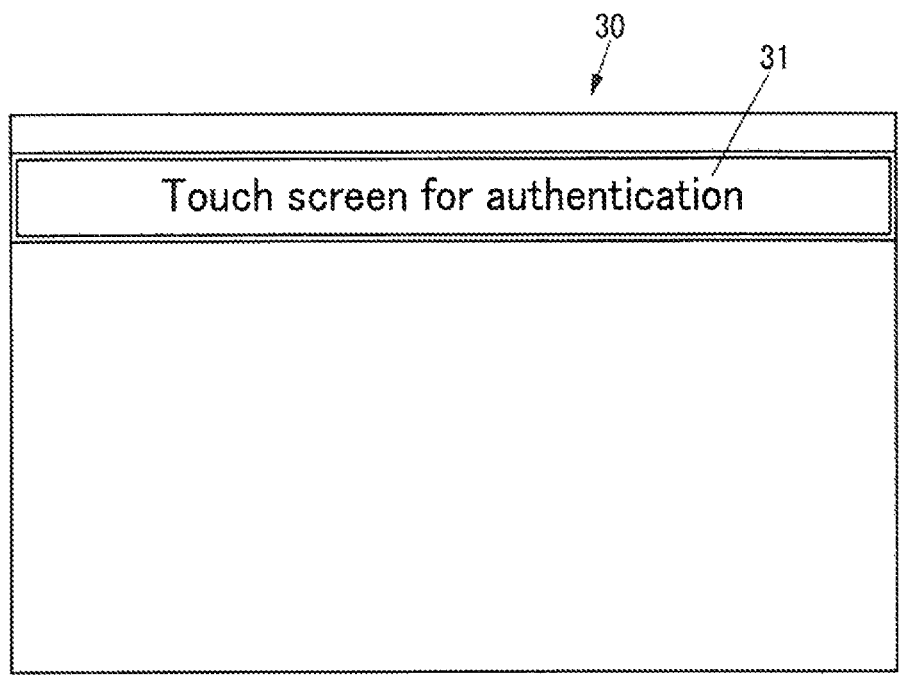
FIG. 4 shows an authentication screen displayed on a touch panel shown in FIG. 1.

By contrast, when it is determined at Step S101 that the authentication registration information 13b is stored in the storage section 13 (YES at Step S101), the authentication section 14a causes the touch panel 12 to display an authentication screen 30 shown in FIG. 4 (Step S102).

FIG. 4 shows the authentication screen 30 displayed on the touch panel.

The authentication screen 30 shown in FIG. 4 displays a message 31 "touch screen for user authentication".

As shown in FIGS. 2 and 3, after Step 102, the time information obtaining section 14b determines whether or not a user's touch on the touch panel 12 is detected (step S103). When it is determined at Step S103 that no touch on the touch panel 12 is detected (NO at Step S103), the time information obtaining section 14b repeatedly execute Step 103 until detection of a user's touch on the touch panel 12 is determined.

When it is determined at Step S103 that a user's touch on the touch panel 12 is detected (YES at Step S103), the time information obtaining section 14b initializes the authentication time information (Step S104). The term "initialize" herein means processing to set the time that the authentication time information indicates to be zero.

Next, the time information obtaining section 14b sets an amount of change in the time that the authentication time information indicates according to the number of touch points 32 on the touch panel 12 (Step S105).

Figure 5A:
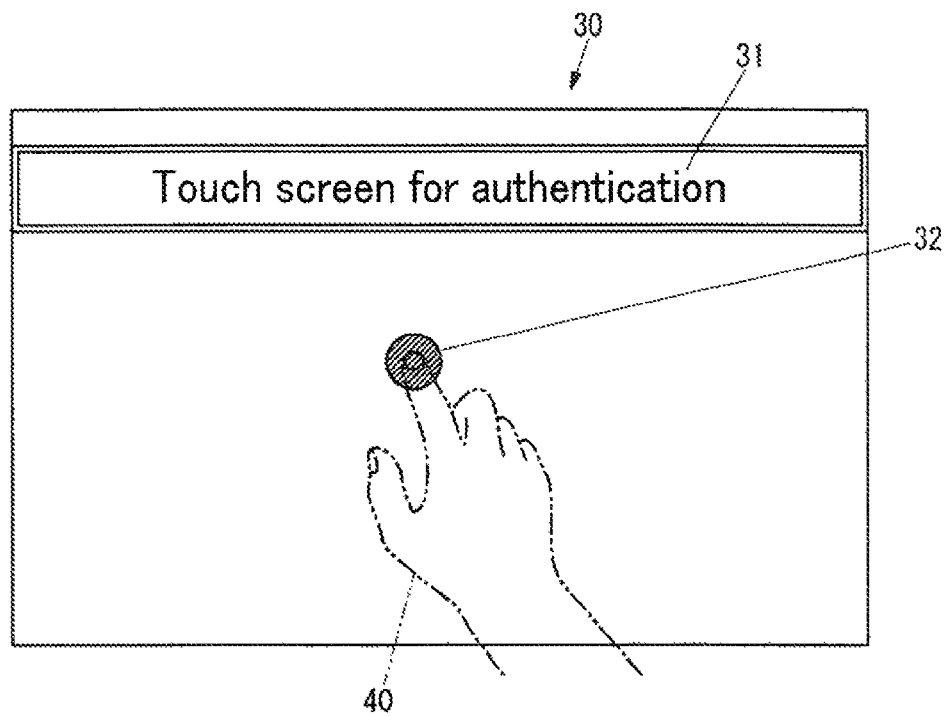
FIG. 5A shows an example of the authentication screen shown in FIG. 4 where a single touch point is on the touch panel.
Figure 5B:
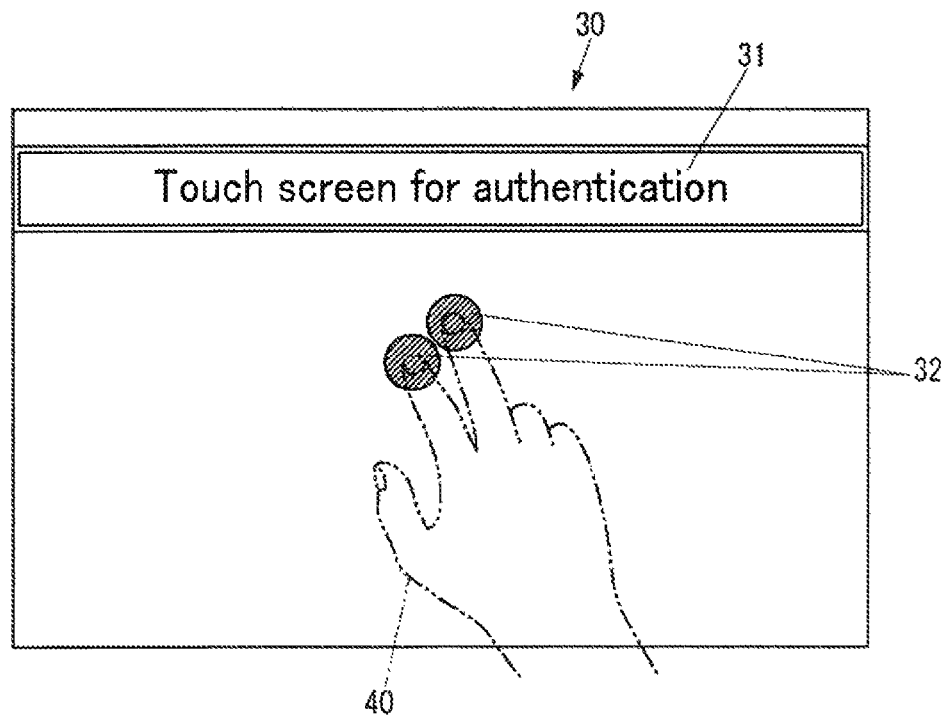
FIG. 5B shows an example of the authentication screen shown in FIG. 4 where two touch points are on the touch panel.

FIG. 5A shows an example of the authentication screen 30 when a single touch point 32 on the touch panel 12 is detected. FIG. 5B shows an example of the authentication screen 30 when two touch points 32 on the touch panel 12 are detected.

For easy understanding, FIGS. 5A and 5B show a user's hand 40 together with the touch point(s) 32. It is noted that the touch points 32 and the hands 40 in FIGS. 5A and 5B are not images displayed on the touch panel 12. For the sake of convenience, each touch point 32 in FIGS. 5A and 5B is shown as a circle having an area larger than the touch area of the actual touch point.

As shown in FIG. 5A, when a single fingertip of the user's hand 40 touches the touch panel 12 to make a single touch point 32 on the touch panel 12, the time information obtaining section 14b sets the amount of change in the time that the authentication time information indicates to be equal to the amount of change in a user's touch duration at Step S105. Specifically, in obtaining the authentication time information in the normal mode, where the amount of change in the user's touch duration is 1 second (where a duration during which the user touches the touch panel 12 increases by 1 second), the time information obtaining section 14b obtains a value equal to the amount of change in the user's touch duration, that is, 1 second as an amount of change in the time that the authentication time information indicates.

As shown in FIG. 5B, when two fingertips of the user's hand 40 touch the touch panel 12 to make two touch points 32 on the touch panel 12, the time information obtaining section 14b sets the amount of change in the time that the authentication time information indicates to be double the amount of change in the user's touch duration at Step S105. Specifically, in obtaining the authentication time information in the normal mode, where the amount of change in the user's touch duration is 1 second, the time information obtaining section 14b obtains a value that is double the amount of change in the user's touch duration (1 second herein), that is, 2 seconds as an amount of change in the time that the authentication time information indicates.

Similarly, where the number of touch points on the touch panel 12 is three, four, or five, the time information obtaining section 14*b* obtains a value of three, four, or five times the amount of change in the user's touch duration, respectively, as the amount of change in the time that the authentication time information indicates.

In the present embodiment, the user can change the amount of change in the time that the authentication time information indicates in five steps to a value of one, two, three, four, and five times the amount of change in the user's touch duration by changing the number of touch points 32 on the touch panel 12. Thus, user's simple operation in agreement with his/her intuition can change the amount of change in the time that the authentication time information indicates in five steps to values of one to five times the amount of change in the user's touch duration. The number of times and the number of steps of the amount of change in the time that the authentication information indicates, which are set in the time information obtaining section 14*b*, can be change at any values in the authentication program 13*a*.

After Step S105, the time information obtaining section 14*b* starts obtaining the authentication time information based on the setting in the normal mode, as shown in FIG. 2 (Step S106).

Next, the time information obtaining section 14*b* determines whether or not non-touch (no touch point) on the touch panel 12 is detected (Step S107).

When it is determined that the non-touch on the touch panel 12 is detected at Step S107 (YES at Step S107), the time information obtaining section 14*b* stop obtaining the authentication time information based on the setting in the normal mode (Step S108). When it is determined that non-touch on the touch panel 12 is not detected at Step S107 (NO at Step S107), the routine proceeds to Step S131 shown in FIG. 3.

Subsequently, the authentication section 14*a* performs user authentication using the authentication time information obtained by the time information obtaining section 14*b* (Step S109). Specifically, when the value of the time that the authentication time information obtained by the time information obtaining section 14*b* indicates is equal to the value of the time that the authentication registration information 13*b* indicates, the authentication section 14*a* determines that user authentication is successful. Thus, user authentication can be performed with a simple configuration. Even when the value of the time that the authentication time information obtained by the time information obtaining section 14*b* indicates is not equal to the value of the time that the authentication registration information 13*b* indicates, the authentication section 14*a* may determine that the user authentication is successful only if it sufficiently approximates the value of the time that the authentication registration information 13*b* indicates, for example, if an absolute value of the difference between them is equal to or smaller than 0.1 seconds.

The authentication section 14*a* determines whether or not the user authentication is successful at Step S109 (Step S110).

When it is determined that the user authentication is successful at Step S110 (YES at Step S110), the authentication section 14*a* stops displaying the authentication screen 30 on the touch panel 12 (Step S111). Then, the operation shown in FIGS. 2 and 3 is ended. Then, the user is enabled to cause the mobile device 10 to execute any operation.

When it is determined that the user authentication is not successful at Step S110 (NO at Step S110), the routine returns to Step S103, so that the time information obtaining section 14*b* repeats Step S103 and the subsequent steps.

When it is determined at Step S107 that non-touch on the touch panel 12 is not detected (NO at Step S107), the time information obtaining section 14*b* determines whether or not the number of touch points 32 on the touch panel 12 is changed, as shown in FIG. 3 (Step S131).

When it is determined at Step S131 that the number of touch points 32 on the touch panel 12 is changed (YES at Step S131), the time information obtaining section 14*b* sets the amount of change in the time that the authentication time information indicates according to the number of touch points on the touch panel 12 (Step S132) as in Step S105. In this manner, the user can change the amount of change in the time that the authentication time information indicates in the course of obtaining the authentication time information in the normal mode.

When it is determined at Step S131 that the number of touch points 32 on the touch panel 12 is not changed (NO at Step S131), or when Step S132 is completed, the time information display section 14*c* determines whether or not a time display operation is received (step S133). The time display operation herein means an operation by the user to start displaying the time that the authentication time information indicates.

Figure 6A:
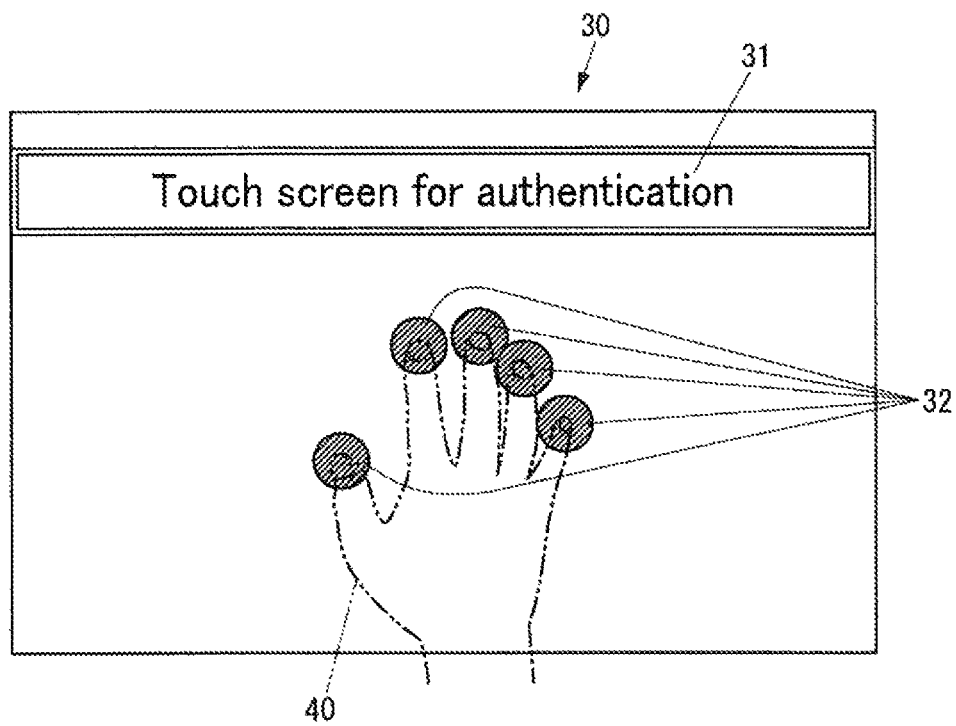
FIG. 6A shows an example of the authentication screen shown in FIG. 4 before an operation to cause display of time that authentication time information indicates is received.
Figure 6B:
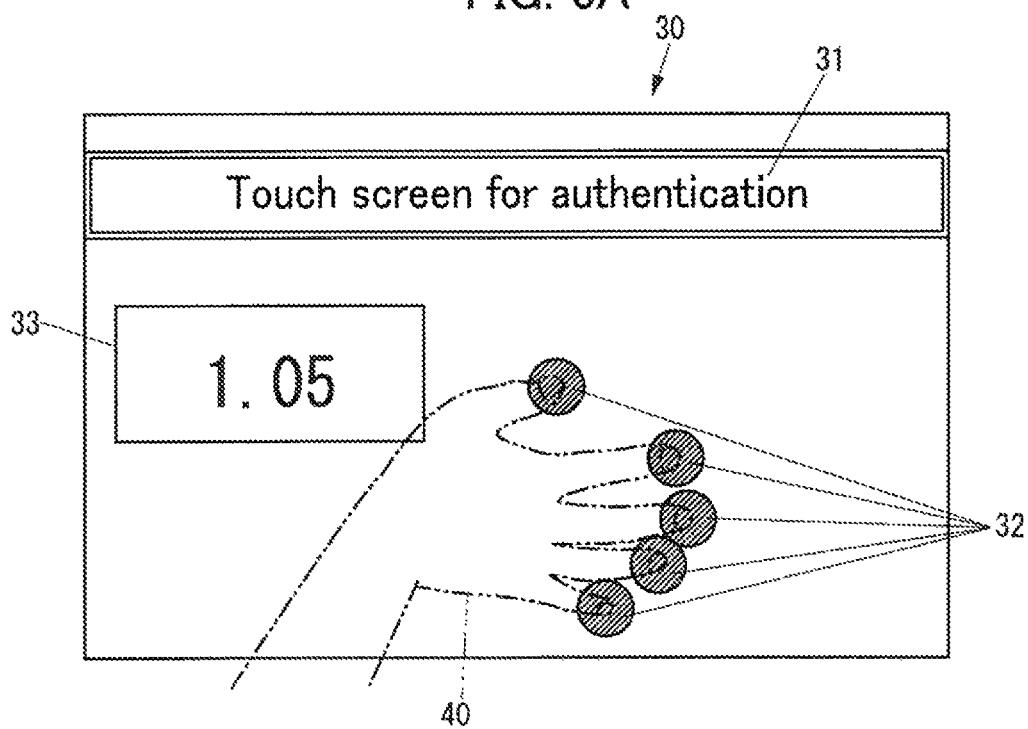
FIG. 6B shows an example of the authentication screen shown in FIG. 4 after the operation to cause display of the time that the authentication time information indicates is received.

FIG. 6A shows an example of the authentication screen 30 before the time display operation is received. FIG. 6B shows an example of the authentication screen 30 after the time display operation is received.

For easy understanding, FIGS. 6A and 6B show the user's hand 40 together with the touch points 32. It is noted that the touch points 32 and the hands 40 in FIGS. 6A and 6B are not images displayed on the touch panel 12. For the sake of convenience, each touch point 32 in FIGS. 6A and 6B is shown as a circle having an area larger than the touch area of the actual touch point. Further, FIG. 6B shows an area 33 to display the time that the authentication time information indicates. The area 33 is an image displayed on the touch panel 12.

The time display operation in the present embodiment starts in a state in which the five fingertips of the user's hand 40 first touch the touch panel 12 to make five touch points 32 on the touch panel 12, as shown in FIG. 6A. Then, as shown in FIG. 6B, the user turns his/her hand 40 clockwise to turn the five touch points 32 on the touch panel 12 clockwise.

When it is determined at Step S133 that the time display operation is received (YES at Step S133), as shown in FIG. 3, the time information display section 14*c* starts displaying the time that the authentication time information indicates in the area 33 in the touch panel 12 as shown in FIG. 6B (Step S134). If the time information display section 14*c* already displays the time that the authentication time information indicates on the touch panel 12 at the time when Step S134 is to be executed, the routine skips (does not executes) Step S134. The start of display of the time that the authentication time information indicates enables the user to check the time that the authentication time information indicates.

When it is determined at Step S133 that the time display operation is not received (NO at Step S133), or Step S134 is completed, the time information display section 14*c* determines whether or not a time display stop operation is received (Step S135). The time display stop operation herein means an operation by a user to stop displaying the time that the authentication time information indicates.

The time display stop operation in the present embodiment is a user's operation in which the five touch points 32 on the touch panel 12 are turned anticlockwise in reverse to that in the time display operation.

When it is determined at Step S135 that the time display stop operation is received (YES at Step S135), the time information display section 14*c* stops displaying the time that the authentication time information indicates on the touch panel 12 (Step S136). If the time information display section 14*c* does not display the time that the authentication time information indicates on the touch panel 12 at S136, the routine skips (does not execute) Step S136.

When it is determined at Step S135 that the time display stop operation is not received (NO at Step S135), or when Step S136 is completed, the time information obtaining section 14b determines whether or not a time information editing mode switch operation is received (Step S137). The time information editing mode switch operation herein means an operation by the user to switch the mode to the time information editing mode.

Figure 7A:
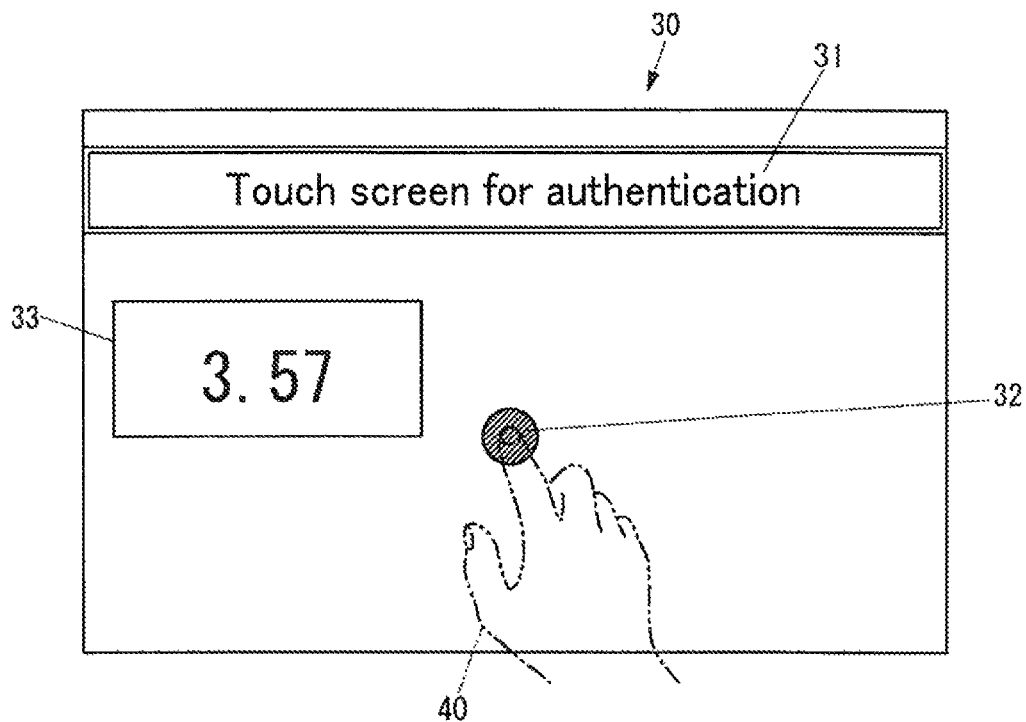
FIG. 7A shows an example of the authentication screen shown in FIG. 4 before an operation for switch to a time information editing mode is received.
Figure 7B:
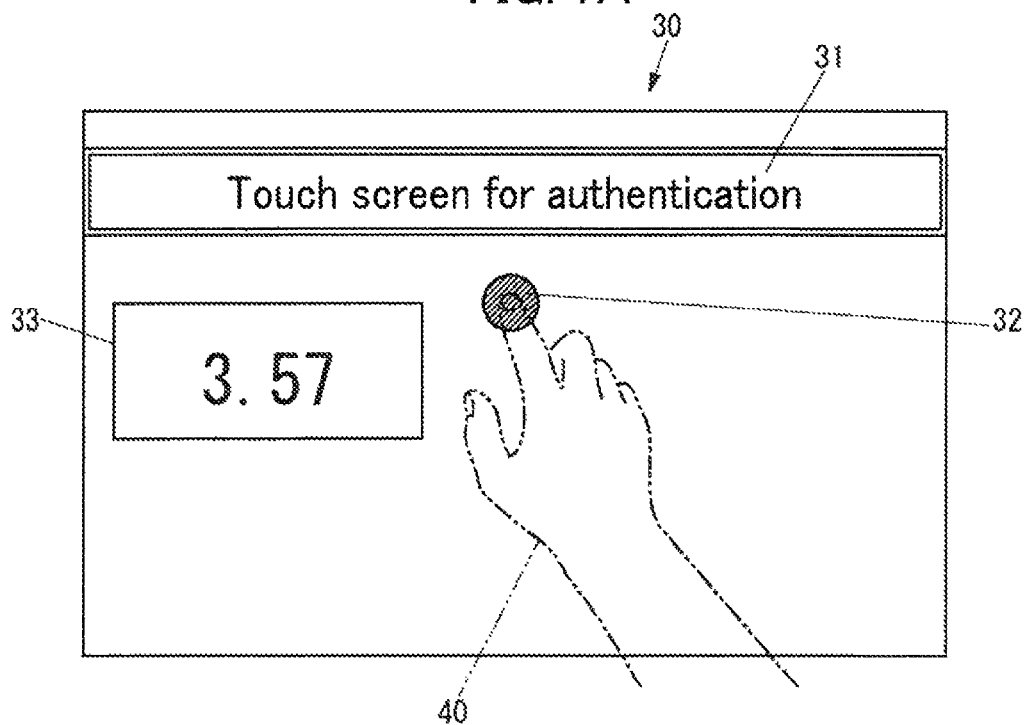
FIG. 7B shows an example of the authentication screen shown in FIG. 4 in the course of receiving the operation for switch to the time information editing mode.

FIG. 7A shows an example of the authentication screen 30 before the time information editing mode switch operation is received. FIG. 7B shows an example of the authentication screen 30 in the course of receiving the time information editing mode switch operation.

For easy understanding, FIGS. 7A and 7B show the user's hand 40 together with the touch point 32. It is noted that the touch points 32 and the hands 40 in FIGS. 7A and 7B are not images displayed on the touch panel 12. For the sake of convenience, each touch point 32 in FIGS. 7A and 7B is shown as a circle having an area larger than the touch area of the actual touch point.

The time information editing mode switch operation in the present embodiment starts in a state in which a user touches the touch panel 12 with a single fingertip of his/her hand 40 to make a single touch point 32 on the touch panel 12, as shown in FIG. 7A. Then, the user moves the hand 40 upward to drag the single touch point 32 upward on the touch panel 12, as shown in FIG. 7B, and then moves it again downward to drag the single touch point downward on the touch panel 12, as shown in FIG. 7A.

When it is determined at Step S137 that the time information editing mode switch operation is not received (NO at Step S137), as shown in FIG. 3, the routine returns to Step S107 shown in FIG. 2, so that the time information obtaining section 14b executes Step S107 and the subsequent steps.

When it is determined at Step S137 that the time information editing mode switch operation is received (YES at Step S137), the time information obtaining section 14b stops obtaining the authentication time information based on the setting in the normal mode (Step S138). In this case, the change in the time that the authentication time information indicates corresponding to the user's touch duration on the touch panel 12 is stopped.

Figure 8:
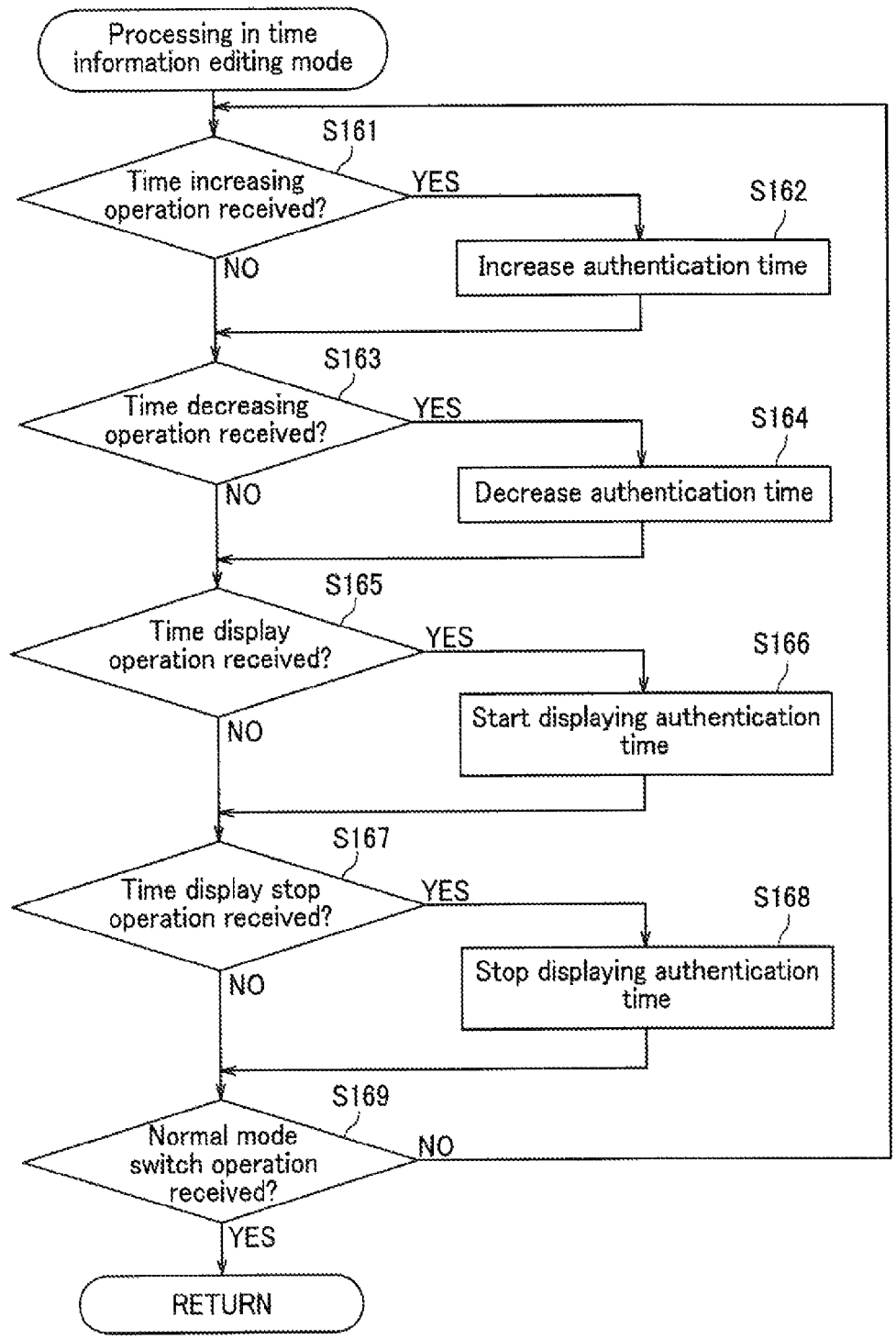
FIG. 8 shows processing in the time information editing mode executed in Step S139 in FIG. 3.

After Step S138, the time information obtaining section 14b executes processing in time information editing mode shown in FIG. 8 (Step S139).

FIG. 8 shows steps of the processing in the time information editing mode executed in S139 in FIG. 3.

As shown in FIG. 8, the time information obtaining section 14b determines whether or not a time increasing operation is input (Step S161). The time increasing operation herein means an operation by the user to increase the time that the authentication time information indicates.

Figure 9A:
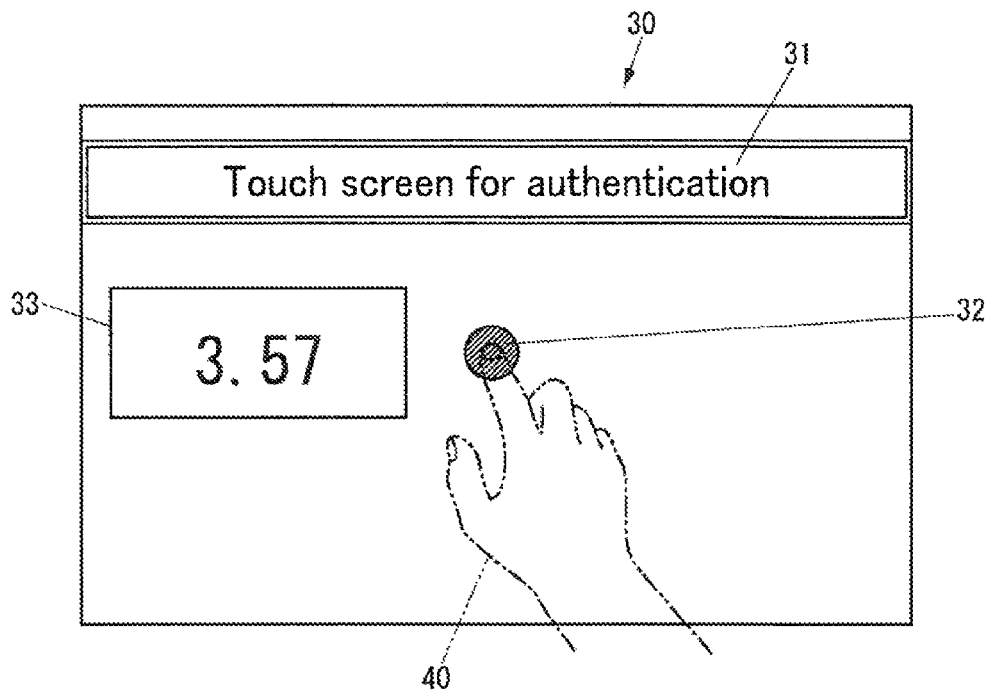
FIG. 9A shows an example of the authentication screen shown in FIG. 4 before an operation to increase the time that authentication time information indicates is received.
Figure 9B:
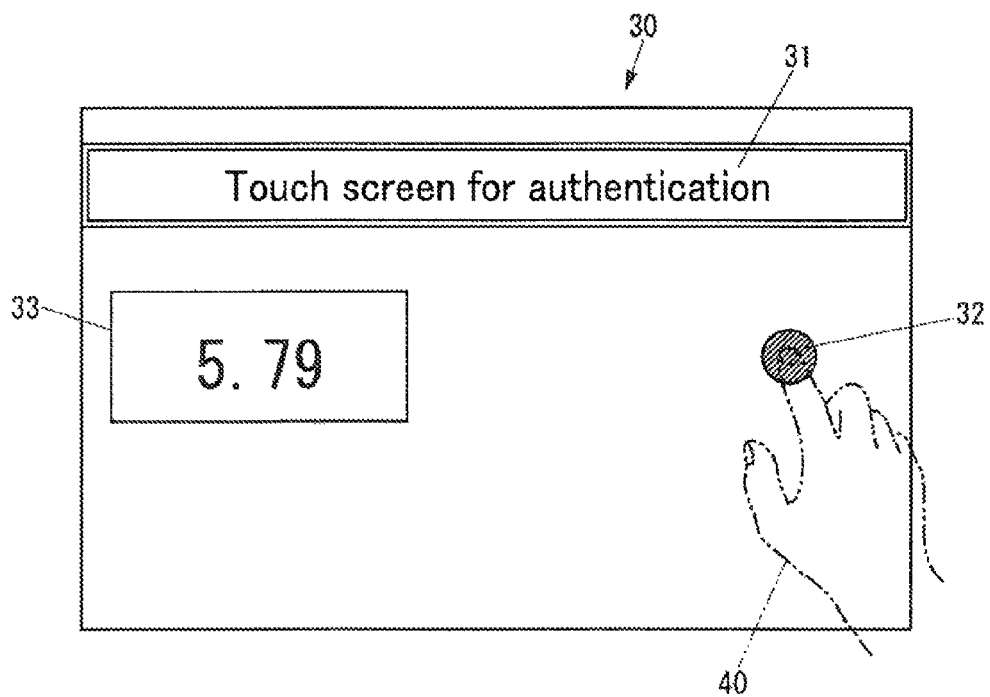
FIG. 9B shows an example of the authentication screen shown in FIG. 4 after the operation to increase the time the authentication time information indicates is received.

FIG. 9A shows an example of the authentication screen 30 before the time increasing operation is received. FIG. 9B shows an example of the authentication screen 30 after the time increasing operation is received.

For easy understanding, FIGS. 9A and 9B show the user's hand 40 together with the touch point 32. It is noted that the touch points 32 and the hands 40 in FIGS. 9A and 9B are not images displayed on the touch panel 12. For the sake of convenience, each touch point 32 in FIGS. 9A and 9B is shown as a circle having an area larger than the touch area of the actual touch point.

The time increasing operation in the present embodiment starts in a state in which a user touches the touch panel 12 with his/her single fingertip with touch panel 12 to make a single touch point 32 on the touch panel 12, as shown in FIG. 9A. Then, the user moves his/her hand 40 rightward to drag the single touch point 32 rightward on the touch panel 12, as shown in FIG. 9B.

When it is determined at Step S161 that the time increasing operation is received (YES at Step S161), the time information obtaining section 14b increases by a specific value the time that the authentication time information indicates (Step S162). The specific value herein is a fixed value, for example, 1 second regardless of the drag length of the touch point 32 in the time increasing operation. Alternatively, the specific value may be a value in proportion to the drag length of the touch point 32 in the time increasing operation, for example. Thus, such a simple operation can increase the time that the authentication time information indicates by time that the user desires.

When it is determined at Step S161 that the time increasing operation is not received, or Step S162 is completed, the time information obtaining section 14b determines whether or not a time decreasing operation is input (Step S163). The time decreasing operation herein means an operation by a user to decrease the time that the authentication time information indicates.

The time decreasing operation in the present embodiment is an operation that a user drags the single touch point 32 leftward on the touch panel 12 in reveres to the time increasing operation. The time that the authentication time information indicates is decreased according to the movement direction of the touch point 32 on the touch panel 12. This means that the simple operation can decrease the time that the authentication time information indicates.

When it is determined at Step S163 that the time decreasing operation is received (YES at Step S163), the time information obtaining section 14b decreases by a specific value the time that the authentication time information indicates (Step S164). The specific value herein means a fixed value, for example, 1 second regardless of the drag length of the touch point 32 in the time decreasing operation. Alternatively, the specific value may be a value in proportion to the drag length of the touch point 32 in the time decreasing operation, for example. Thus, the simple operation can decrease the time that the authentication time information indicates by time that the user desires.

When it is determined at Step S163 that the time decreasing operation is not received (NO at Step S163), or when the step S164 is completed, the time information display section 14c executes Steps S165-S168 that are the same as Steps S133-S136. To avoid redundancy, description about Steps S165-S168 is omitted.

When it is determined at Step S167 that the time display stop operation is not received (NO at Step S167), or when Step S168 is completed, the time information obtaining section 14b determines whether or not a normal mode switch operation is received that is an operation by a user for switch to the normal mode (step S169).

The normal mode switch operation in the present embodiment is an operation that a user moves the hand 40 upward to drag the single touch point 32 upward on the touch panel 12 and again moves it downward to drag the single touch point downward thereon like the time information editing mode switch operation. Thus, the time that the authentication time information indicates is decreased according to the movement direction of the touch point 32 on the touch panel 12. This means that the simple operation can decrease the time that the authentication time information indicates. Further, the movement direction of the touch point 32 on the touch panel 12 in decreasing the time that the authentication time information indicates (leftward in the present embodiment) is reveres to the movement direction of the touch point 32 on the touch panel in increasing the time that the authentication time information indicates (rightward in the present embodiment). Accordingly, the operation to increase and decrease the time that the authentication time information indicates can be in agreement with user's intuition.

When it is determined at Step S169 that the normal mode switch operation is not received (NO at step S169), the routine returns to Step S161, so that the time information obtaining section 14*b* repeats Step S161 and the subsequent steps.

When it is determined at Step S169 that the normal mode switch operation is received (YES at Step S169), the time information obtaining section 14*b* terminates the processing in the time information editing mode. Then, the routine returns to Step S140 shown in FIG. 3.

As shown in FIG. 3, when the processing in the time information editing mode at Step S139 is completed, the time information obtaining section 14*b* determines whether or not a user's touch on the touch panel 12 is detected (Step S140).

When it is determined at Step S140 that a user's touch on the touch panel 12 is detected (YES at Step S140), the routine returns to Step S105 shown in FIG. 2, so that the time information obtaining section 14*b* repeats Step S105 and the subsequent steps.

When it is determined at Step S140 that no touch on the touch panel 12 is detected (NO at Step S140), the routine returns to Step S109 shown in FIG. 2, so that the authentication section 14*a* repeats Step S109 and the subsequent steps.

As described above, in changing the time that the authentication time information indicates according to the user's touch duration during which a user touches the touch panel 12 (Step S106), the amount of change in the time that the authentication time information indicates is changed according to the user's manner of touching the touch panel 12 (Steps S105 and S132). With this configuration, the time for which a user is required to touch the touch panel 12 can be changed while the user touches the touch panel 12 for user authentication. Accordingly, even if a third person measures the user's touch duration on the touch panel 12 for user authentication, a possibility of fraudulent user authentication by the third person's impersonation can be reduced. Thus, security for user authentication can be enhanced in the mobile device 10.

As Step S105 shown in FIG. 2 and Step S132 shown in FIG. 3 have been described with reference to FIGS. 5A and 5B, the mobile device 10 employs the multi-touch manner of making two or more touch points 23 on the touch panel 12. This can increase the amount of change in the time that the authentication time information indicates as compared with the amount of change in the user's touch duration on the touch panel 12. Accordingly, by the increase in the amount of change in the time that the authentication time information indicates as compared with the amount of change in the user's touch duration on the touch panel 12, the user authentication can be completed more quickly than a traditional one.

The amount of change in the time that the authentication time information indicates is increased according to an increase in the number of touch points 32 on the touch panel 12. Accordingly, a user can readily remember the operation to change the amount of change in the time that the authentication time information indicates, thereby resulting in enhanced user friendliness.

The present embodiment has described the mobile device 10 in which the amount of change in the time that the authentication time information indicates is increased according to an increase in the number of touch points 32 on the touch panel 12. In another embodiment, the amount of change in the time that the authentication time information indicates may be increased according to an increase in the touch area of a touch point on the touch panel 12 in the mobile device 10.

In the mobile device 10, the time that the authentication time information indicates can be decreased according to the user's manner of touching of dragging a single touch point 32 leftward on the touch panel 12 (Step S164 in FIG. 8). Accordingly, by decreasing the time that the authentication time information indicates, the time that the authentication time information indicates can be adjusted when the time that the authentication time information indicates is increased excessively. Thus, the user authentication can be facilitated in the mobile device 10.

The present embodiment has described the mobile device 10 in which the time that the authentication time information indicates is decreased in the time information editing mode according to the user's manner of touching the touch panel 12. In another embodiment, the time that the authentication time information indicates may be decreased also in the normal mode according to the user's manner of touching the touch panel 12. In this case, in the mobile device 10 in the normal mode also, the time that the authentication time information indicates can be decreased by setting the amount of change in the time that the authentication time information indicates corresponding to the amount of change in the user's touch duration on the touch panel 12 to be a negative value.

The time that the authentication time information indicates is displayed on the touch panel 12 (Step S134 in FIG. 3 and Step S166 in FIG. 8) in the mobile device 10. Accordingly, even when the amount of change in the time that the authentication time information indicates corresponding to the amount of change in the user's touch duration on the touch panel 12 is changed, the operation by a user for user authentication can be facilitated.

Even when the time that the authentication time information indicates is not displayed on the touch panel 12 in the normal mode, the user can input through the touch panel 12 desired time as the time that the authentication time information indicates. For example, the user may guess the time with his/her own sense. Alternatively, a timer separate from the mobile device 10 may be used for time measurement, for example. By contrast, displaying the time that the authentication time information indicates on the touch panel 12 (Step S134 in FIG. 3 and Step S166 in FIG. 8) can achieve user's easy and accurate check on the time that the authentication time information indicates.

The touch panel 12 displays the time that the authentication time information indicates (Step S134 in FIG. 3 and Step S166 in FIG. 8). Accordingly, user's operation can be facilitated when the time that the authentication time information indicates is changed according to the user's operation in the time information editing mode.

Even when the touch panel 12 does not display the time that the authentication time information indicates, the mobile device 10 can be switched to the time information editing mode in the present embodiment. In another embodiment, the mobile device 10 may be switched to the time information editing mode only when the touch panel 12 displays the time that the authentication time information indicates. In this case, since the mobile device 10 can be switched to the time information editing mode only when the touch panel 12 displays the time that the authentication time information indicates, Steps S165-S168 can be eliminated in the processing in the time information editing mode.

The touch panel 12 of the mobile device 10 can be switched between a display state and a non-display state of the time that the authentication time information indicates (Steps S133-S136 in FIG. 3 or Steps S165-S168 in FIG. 8). With this configuration, the touch panel 12 of the mobile device 10 can be caused not to display the time that the authentication time information indicates when there is a possibility that a third person views the time that the authentication time information indicates on the touch panel 12. Thus, security for user authentication can be enhanced.

The touch panel 12 of the mobile device 10 can be switched between the display state and the non-display state of the time that the authentication time information indicates according to the user's manner of touching the touch panel 12, that is, by the time display operation or the time display stop operation. Accordingly, input of the time that the authentication time information indicates and switch of the touch panel 12 between the display state and the non-display state of the time that the authentication time information indicates can be carried out through the single touch panel 12. Thus, user friendliness can be enhanced.

The mobile device 10 can be switched between the normal mode and the time information editing mode (Step S137 in FIG. 3 and Step S169 in FIG. 8). With this configuration, the time that the authentication time information indicates can be changed in the time information editing mode regardless of the user's touch duration on the touch panel 12. Thus, the user's input of the time that the authentication time information indicates can be facilitated.

The mobile device 10 can be switched between the normal mode and the time information editing mode according to the user's manner of touching the touch panel 12, that is, by the time information editing mode switch operation and the normal mode switch operation. Accordingly, input of the time that the authentication time information indicates and switch between the normal mode and the time information editing mode can be carried out through the single touch panel 12. Thus, user friendliness can be enhanced.

The user's manner of touching the touch panel 12 presented in the present embodiment is a mere example. For example, any touch manner other than the user's manner of touching the touch panel 12 described in the present embodiment may be employed to change the amount of change in the time that the authentication time information indicates corresponding to the amount of change in the user's touch duration on the touch panel 12 in the normal mode. Also, any touch manner other than the user's manner of touching the touch panel 12 described in the present embodiment may be employed for the time display operation, the time display stop operation, the time information editing mode switch operation, and/or the normal mode switch operation.

User authentication can be carried through the touch panel 12 in the mobile device 10. This enables user authentication without need of a special device such as a fingerprint authentication device and a retina authentication device.

Since user authentication can be carried out by a fingertip touch on the touch panel 12 of the mobile device 10, contamination caused by a touch on the touch panel 12 can be reduced as compared with a case of user authentication by placing his/her entire palm on the touch panel 12, for example.

Moreover, the authentication device in the present disclosure is a mobile device in the present embodiment, but may be an electronic device other than the mobile device as long as it includes a touch panel. For example, the authentication device in the present disclosure may be an image forming apparatus such as a multifunction peripheral (MFP) and a dedicated printer.

What is claimed is:

1. A non-transitory computer-readable storage medium having stored thereon an authentication program that, when executed by a computer in an electronic device equipped with a touch panel, causes the electronic device to function as:
    an authentication section that executes user authentication; and
    a time information obtaining section that obtains time information for user authentication,
    wherein the authentication section executes user authentication based on the time information obtained by the time information obtaining section,
    the time information obtaining section changes time that the time information indicates according to a user's touch duration during which a user touches the touch panel and changes an amount of change in time that the time information indicates according to a user's manner of touching the touch panel,
    wherein the time information obtaining section increases the amount of change in the time that the time information indicates according to each increase in at least one, as the user's manner, of the number of touch points and a touch area on the touch panel,
    wherein the time information obtaining section has a normal mode and a time information editing mode, the normal mode being a mode in which the time that the time information indicates is changed according to the user's touch duration and the user's manner of touching the touch panel by the user, and the time information editing mode being a mode in which the time information is changed according to only the user's manner of touching the touch panel out of the user's touch duration and the user's manner of touching the touch panel, and the time information obtaining section switches its own mode between the normal mode and the time information editing mode based on a user's state of touching the touch panel,
    wherein in the time information editing mode, the time information obtaining section increases or decreases the time that the time information indicates according to a movement direction of a touch point on the touch panel, and
    wherein in the time information editing mode, the movement direction of the touch point on the touch panel in decreasing the time that the time information indicates is reverse to the movement direction of the touch point on the touch panel in increasing the time that the time information indicates.

2. A non-transitory computer-readable storage medium according to claim 1, wherein
    the time information obtaining section is capable of increasing the amount of change in the time that the time information indicates as compared with an amount of change in the user's touch duration according to the user's manner of touching the touch panel.

3. A non-transitory computer-readable storage medium according to claim 1, wherein
    the time information obtaining section is capable of decreasing the time that the time information indicates according to the user's manner of touching the touch panel.

4. A non-transitory computer-readable storage medium according to claim 1, wherein
    the authentication program causes the computer to functioning as a time information display section that displays the time that the time information indicates on the touch panel.

5. A non-transitory computer-readable storage medium according to claim 4, wherein
the time information display section switches the touch panel between a display state and a non-display state of the time that the time information indicates according to a user's state of touching the touch panel.

6. A non-transitory computer-readable storage medium according to claim 5, wherein
the time information display section switches the touch panel between the display state and the non-display state of the time that the time information indicates according to the user's manner of touching the touch panel.

7. A non-transitory computer-readable storage medium according to claim 1, wherein
the time information obtaining section switches its own mode between the normal mode and the time information editing mode according to the user's manner of touching the touch panel.

8. A non-transitory computer-readable storage medium according to claim 1, wherein
the time information obtaining section sets the amount of change in the time that the time information indicates in proportion to the number of touch points on the touch panel.

9. A non-transitory computer-readable storage medium according to claim 1, wherein
in the time information editing mode, the time information obtaining section increases or decreases the amount of change in the time that the time information indicates according to a drag length of the touch point on the touch panel.

10. A non-transitory computer-readable storage medium according to claim 1, wherein
the authentication section executes the user authentication in a manner to determine whether or not a value of the time that the time information obtained by the time information obtaining section indicates is equal to a value of a specific reference time.

11. An authentication device, comprising:
a touch panel;
a hardware processor configured to execute instructions stored in a memory, the instructions comprising:
an authentication section that executes user authentication; and
a time information obtaining section that obtains time information for the user authentication,
wherein the authentication section executes the user authentication based on the time information obtained by the time information obtaining section, and
the time information obtaining section changes time that the time information indicates according to a user's touch duration during which a user touches the touch-panel and changes an amount of change in time that the time information indicates according to a user's manner of touching the touch panel,
wherein the time information obtaining section increases the amount of change in the time that the time information indicates according to each increase in at least one, as the user's manner, of the number of touch points and a touch area on the touch panel,
wherein the time information obtaining section has a normal mode and a time information editing mode, the normal mode being a mode in which the time that the time information indicates is changed according to the user's touch duration and the user's manner of touching the touch panel by the user, and the time information editing mode being a mode in which the time information is changed according to only the user's manner of touching the touch panel out of the user's touch duration and the user's manner of touching the touch panel, and the time information obtaining section switches its own mode between the normal mode and the time information editing mode based on a user's state of touching the touch panel,
wherein in the time information editing mode, the time information obtaining section increases or decreases the time that the time information indicates according to a movement direction of a touch point on the touch panel, and
wherein in the time information editing mode, the movement direction of the touch point on the touch panel in decreasing the time that the time information indicates is reverse to the movement direction of the touch point on the touch panel in increasing the time that the time information indicates.

12. An authentication method comprising:
executing, via an authentication section, user authentication; and
obtaining, via a time information obtaining section, time information for the user authentication,
wherein the authentication section executes the user authentication based on the time information obtained by the time information obtaining section, and
the time information obtaining section changes the time information according to a user's touch duration during which a user touches the touch panel and changes an amount of change in time that the time information indicates according to a user's manner of touching the touch panel,
wherein the time information obtaining section increases the amount of change in the time that the time information indicates according to each increase in at least one, as the user's manner, of the number of touch points and a touch area on the touch panel,
wherein the time information obtaining section has a normal mode and a time information editing mode, the normal mode being a mode in which the time that the time information indicates is changed according to the user's touch duration and the user's manner of touching the touch panel by the user, and the time information editing mode being a mode in which the time information is changed according to only the user's manner of touching the touch panel out of the user's touch duration and the user's manner of touching the touch panel, and the time information obtaining section switches its own mode between the normal mode and the time information editing mode based on a user's state of touching the touch panel,
wherein in the time information editing mode, the time information obtaining section increases or decreases the time that the time information indicates according to a movement direction of a touch point on the touch panel, and
wherein in the time information editing mode, the movement direction of the touch point on the touch panel in decreasing the time that the time information indicates is reverse to the movement direction of the touch point on the touch panel in increasing the time that the time information indicates.

* * * * *